United States Patent
Pinto et al.

(10) Patent No.: US 12,468,486 B2
(45) Date of Patent: Nov. 11, 2025

(54) SYSTEMS, METHODS, AND APPARATUS FOR THE MANAGEMENT OF DEVICE LOCAL MEMORY

(71) Applicant: Samsung Electronics Co., Ltd., Suwon-si (KR)

(72) Inventors: Oscar P. Pinto, San Jose, CA (US); William Martin, Roseville, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/855,753

(22) Filed: Jun. 30, 2022

(65) Prior Publication Data

US 2023/0042551 A1    Feb. 9, 2023

Related U.S. Application Data

(60) Provisional application No. 63/229,067, filed on Aug. 3, 2021.

(51) Int. Cl.
G06F 3/06    (2006.01)

(52) U.S. Cl.
CPC .......... G06F 3/0664 (2013.01); G06F 3/0604 (2013.01); G06F 3/0659 (2013.01); G06F 3/0673 (2013.01)

(58) Field of Classification Search
CPC .... G06F 3/0664; G06F 3/0604; G06F 3/0659; G06F 3/0673
See application file for complete search history.

(56) References Cited

U.S. PATENT DOCUMENTS

| | | | | |
|---|---|---|---|---|
| 8,972,689 | B1* | 3/2015 | de la Iglesia | G06F 3/0653 711/149 |
| 9,152,505 | B1* | 10/2015 | Brooker | G06F 21/6218 |
| 11,467,776 | B1* | 10/2022 | Chang | G06F 3/061 |
| 2015/0324285 | A1 | 11/2015 | Murphy et al. | |
| 2019/0121547 | A1* | 4/2019 | Frolikov | G06F 3/0631 |

FOREIGN PATENT DOCUMENTS

WO    2020186081 A1    9/2020

OTHER PUBLICATIONS

European Extended Search Report for Application No. 22185922.6, mailed Jan. 3, 2023.

Kwon, Dongup et al., "A Fast and Flexible Hardware-Based Virtualization Mechanism for Computational Storage Devices," USENIX Association, 2021 USENIX Annual Technical Conference, 2021, 16 pages.

(Continued)

*Primary Examiner* — Baboucarr Faal
(74) *Attorney, Agent, or Firm* — Renaissance IP Law Group LLP

(57) ABSTRACT

Provided are systems, methods, and apparatuses for managing storage device memory. A method can include receiving, from a host, a command for managing the memory; performing, by the storage device, the command on first data stored on the memory via at least one processing element in the storage device to generate second data; and transmitting, by the storage device, third data based on the second data to the host.

20 Claims, 12 Drawing Sheets

(56) References Cited

OTHER PUBLICATIONS

Molgaard, Jason, "A Simple Approach to Implementing Computational Storage Storage Solutions Architect Arm," SDC, SNIA Computational Storage, Storage Solutions Architect Arm, 2019 Storage Developer Conference, 25 pages.

SNIA, SNIA Advancing Storage & Information Technology, "Computational Storage API," Version 0.5 Rev 0, 2021, 125 pages.

European Office Action for Application No. 22185922.6, mailed Aug. 8, 2025.

* cited by examiner

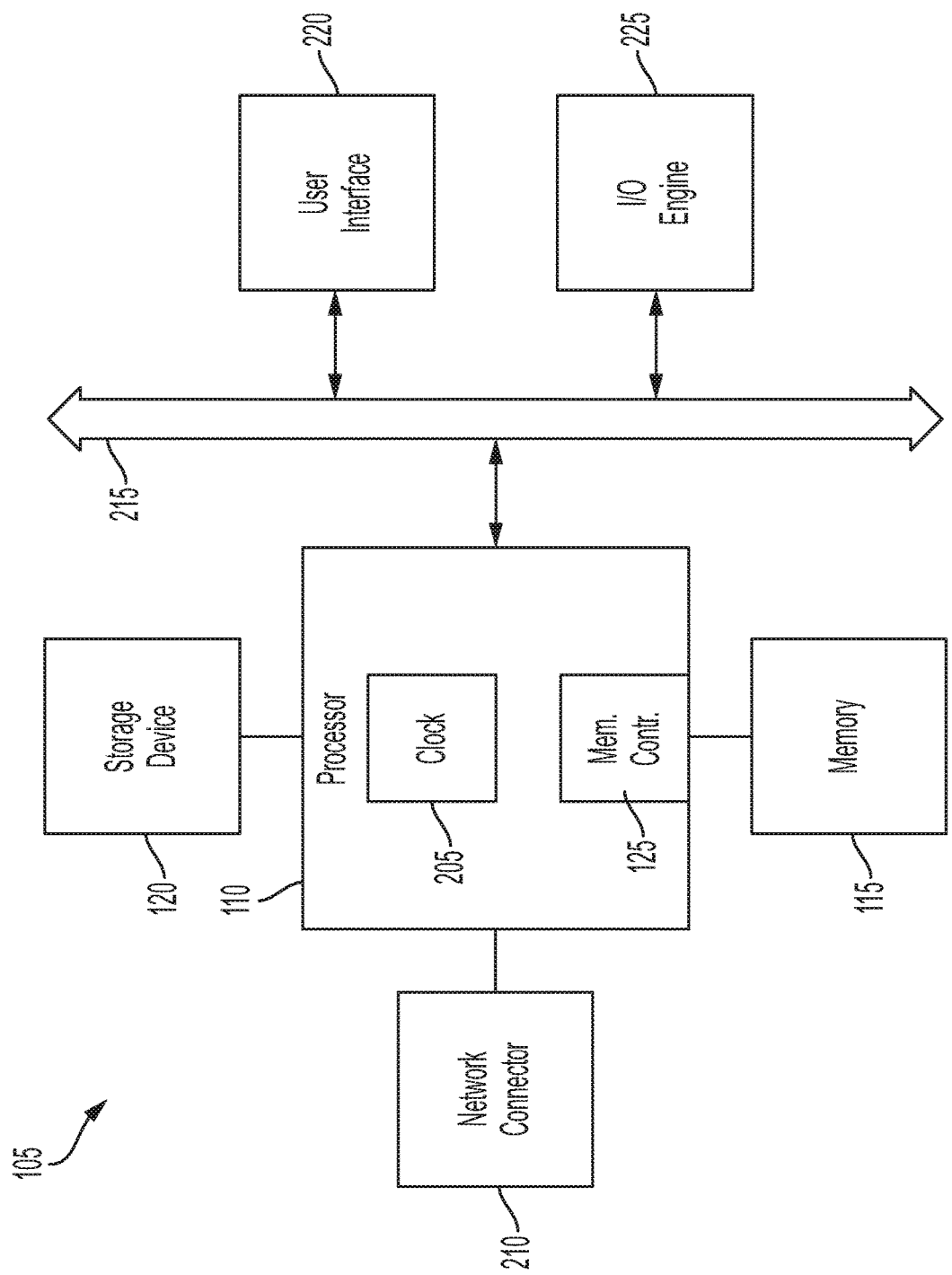

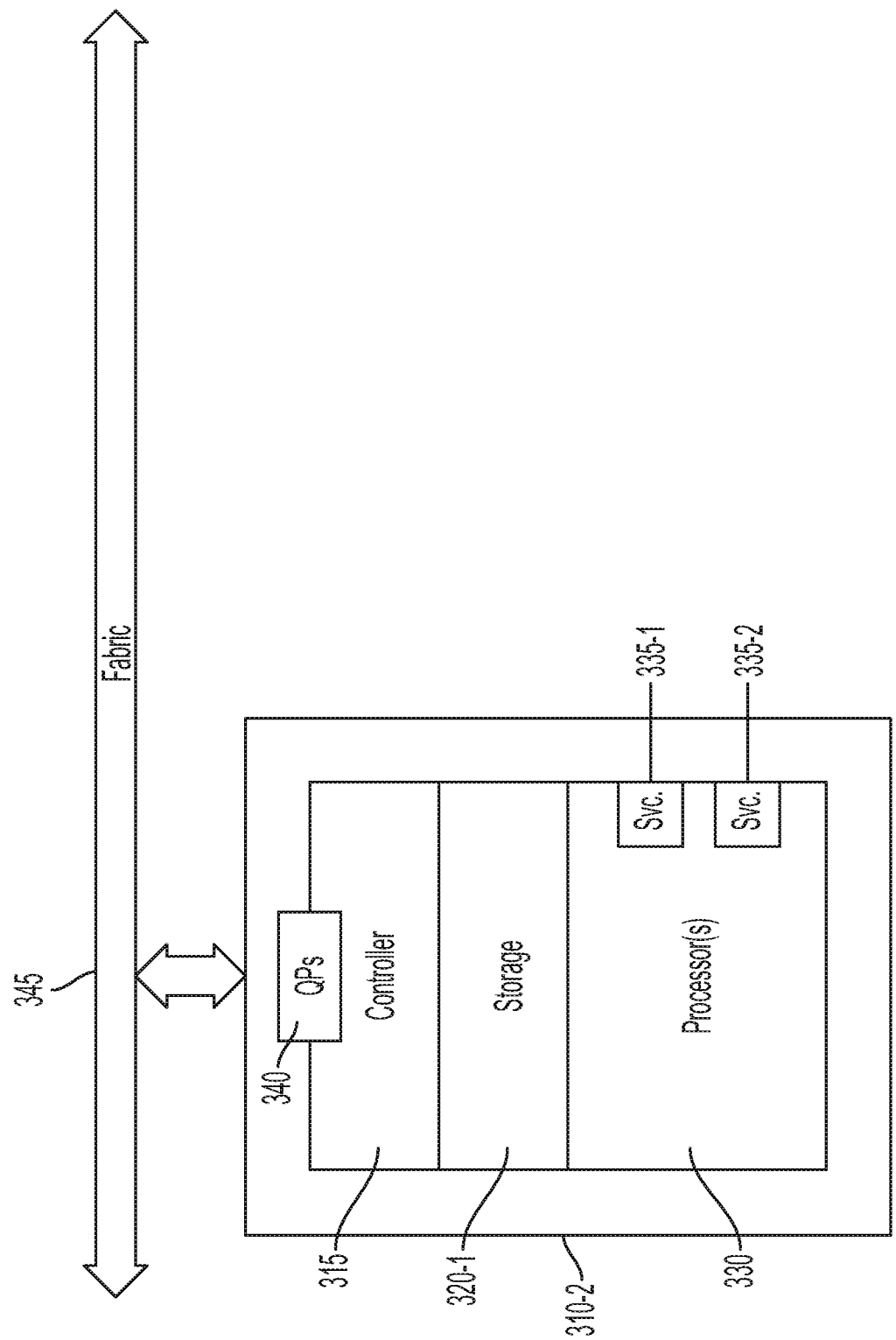

| Bits | Description |
|---|---|
| 127:104 | Reserved |
| 103:96 | Memory Clear Byte (MCB): This field denotes the byte to be used to clear the memory with. Default is set to '0'. |
| 95:64 | Memory Range Length (MRL): This field denotes the length of the memory range from MRS to clear. |
| 63:00 | Memory Range Start (MRS): This field specifies the start of the memory range that needs to be cleared. |

FIG. 5

SYSTEMS, METHODS, AND APPARATUS FOR THE MANAGEMENT OF DEVICE LOCAL MEMORY

CROSS-REFERENCE TO RELATED APPLICATIONS

This application claims the benefit of U.S. Provisional Patent Application No. 63/229,067 entitled "MANAGEMENT OF DEVICE LOCAL MEMORY" filed Aug. 3, 2021 which is incorporated by reference herein for all purposes.

FIELD

The disclosure generally relates to a storage system, and more particularly to systems and methods for managing memory for computation storage devices.

BACKGROUND

The present background section is intended to provide context only, and the disclosure of any concept in this section does not constitute an admission that said concept is prior art.

With advances in technology, the size and amount of data is increasing rapidly as data is collected by devices such as mobile devices, Internet of things devices, aerial (remote sensing) devices, software logs, cameras, microphones, radio-frequency identification (RFID) readers, wireless sensor networks, and the like. To process and use information represented by the collected data, storage devices, processing elements, and servers are often used in datacenters to filter, compute, store, and perform related operations on the data. A need remains for systems and methods that improve computational functions in storage devices.

The above information disclosed in this Background section is only for enhancement of understanding of the background of the disclosure and therefore it may contain information that does not constitute prior art.

SUMMARY

In various embodiments, described herein include systems, methods, and apparatuses for data transfers for computation storage devices. In particular, a method for In various aspects, a method for managing a memory of a storage device is described. The method can include receiving, from a host, a command for managing the memory; performing, by the storage device, the command on first data stored on the memory via at least one processing element in the storage device to generate second data; and transmitting, by the storage device, third data based on the second data to the host.

In some embodiments, the command comprises an operation to set at least a portion of first data to a predetermined bit, and the third data comprises a completion indication. In other embodiments, the memory comprises volatile memory or non-volatile memory located within the storage device and the method further comprises virtualizing the volatile memory or non-volatile memory. In one embodiment, the method comprises communicating, to the host, via a virtual address associated with the volatile memory. In some embodiments, the method further comprises dedicating a portion of the virtualized memory for a first operation or for a first duration. In other embodiments, the command comprises a command generated by an application on the host and received via an application program interface (API). In certain embodiments, the storage device comprises a non-volatile memory express (NVMe) enabled storage device or an NVMe-over-Fabric (NVMe-oF) enabled storage device.

A system for managing functions is described. The system can include a host comprising an application; a storage device comprising a processing element, and a memory; wherein the system stores computer-executable instructions which, when executed by a processor, cause the processor to perform operations comprising receiving, from the application on the host, a command for managing the memory; performing, by the storage device, the command on first data stored on the memory via at least one processing element in the storage device to generate second data; and transmitting, by the storage device, third data based on the second data to the host. In some embodiments, the command comprises an operation to set at least a portion of first data to a predetermined bit, and the third data comprises a completion indication. In other embodiments, the memory comprises volatile memory or non-volatile memory located within the storage device and the method further comprises virtualizing the volatile memory or non-volatile memory. In various embodiments, the operations further comprise communicating, to the host, via a virtual address associated with the volatile memory. In additional embodiments, the operations further comprise dedicating a portion of the virtualized memory for a first operation or for a first duration. In some embodiments, the command comprises a command generated by an application on the host and received via an API. In other embodiments, the storage device comprises an NVMe enabled storage device or an NVMe-oF enabled storage device.

In various embodiments, a non-transitory computer-readable medium is described, the computer-readable medium storing instructions that, when executed by a computer, cause the computer to perform operation for managing a memory of a storage device. The operations can include receiving, from a host, a command for managing the memory; performing, by the storage device, the command on first data stored on the memory via at least one processing element in the storage device to generate second data; and transmitting, by the storage device, third data based on the second data to the host.

In some embodiments, the command comprises an operation to set at least a portion of first data to a predetermined bit, and the third data comprises a completion indication. In other embodiments, the memory comprises volatile memory or non-volatile memory located within the storage device and the method further comprises virtualizing the volatile memory or non-volatile memory. In certain embodiments, the operations further comprise communicating, to the host, via a virtual address associated with the volatile memory. In additional embodiments, the operations further comprise dedicating a portion of the virtualized memory for a first operation or for a first duration. In some embodiments, the command comprises a command generated by an application on the host and received via an API.

Accordingly, particular embodiments of the subject matter described herein can be implemented so as to realize one or more of the following advantages. Providing various protocols and techniques to clear device local memory. Providing mechanisms that can be applied broadly across direct and virtualized environments. Allowing memory management techniques that may be expanded to scale with multiple devices with minimal host intervention. Can be used in connection with various standardized protocols. Reduce network latencies and improve network stability and operational data transfer rates and, in turn, improve the user experience. Reduce costs associated with routing network traffic, network maintenance, network upgrades, and/or the like. Further, in some aspects, the disclosed systems can serve to reduce the power consumption and/or bandwidth of devices on a network, and may serve to increase the speed and/or efficiency of communications between devices. Moreover, the disclosed systems and methods can serve to provide a seamless mechanism that works for direct-attached and network-attached drives. Further, the disclosed mechanisms can be applied to a computational storage device (e.g., a storage device having a processing functionality) and related systems. In other aspects, the disclosed systems can be used in connection with any suitable storage device such a non-volatile memory express (NVMe), an NVMe-over fabric (NVMe-oF), and/or non-NVMe solid state drives (SSDs). Further, the disclosed systems and methods can be standardized and applied to a range of storage devices and related systems while being agnostic to vendor.

BRIEF DESCRIPTION OF THE DRAWINGS

The above-mentioned aspects and other aspects of the present techniques will be better understood when the present application is read in view of the following figures in which like numbers indicate similar or identical elements. Further, the drawings provided herein are for purpose of illustrating certain embodiments only; other embodiments, which may not be explicitly illustrated, are not excluded from the scope of this disclosure.

These and other features and advantages of the present disclosure will be appreciated and understood with reference to the specification, claims, and appended drawings wherein:

FIG. 2 shows details of the machine of FIG. 1, according to embodiments of the disclosure.

FIG. 3B shows a second example arrangement of a computational storage unit that may be associated with the storage device of FIG. 1, according to embodiments of the disclosure.

FIG. 5 shows another schematic diagram of an example memory command, according to embodiments of the disclosure.

Figure 1:
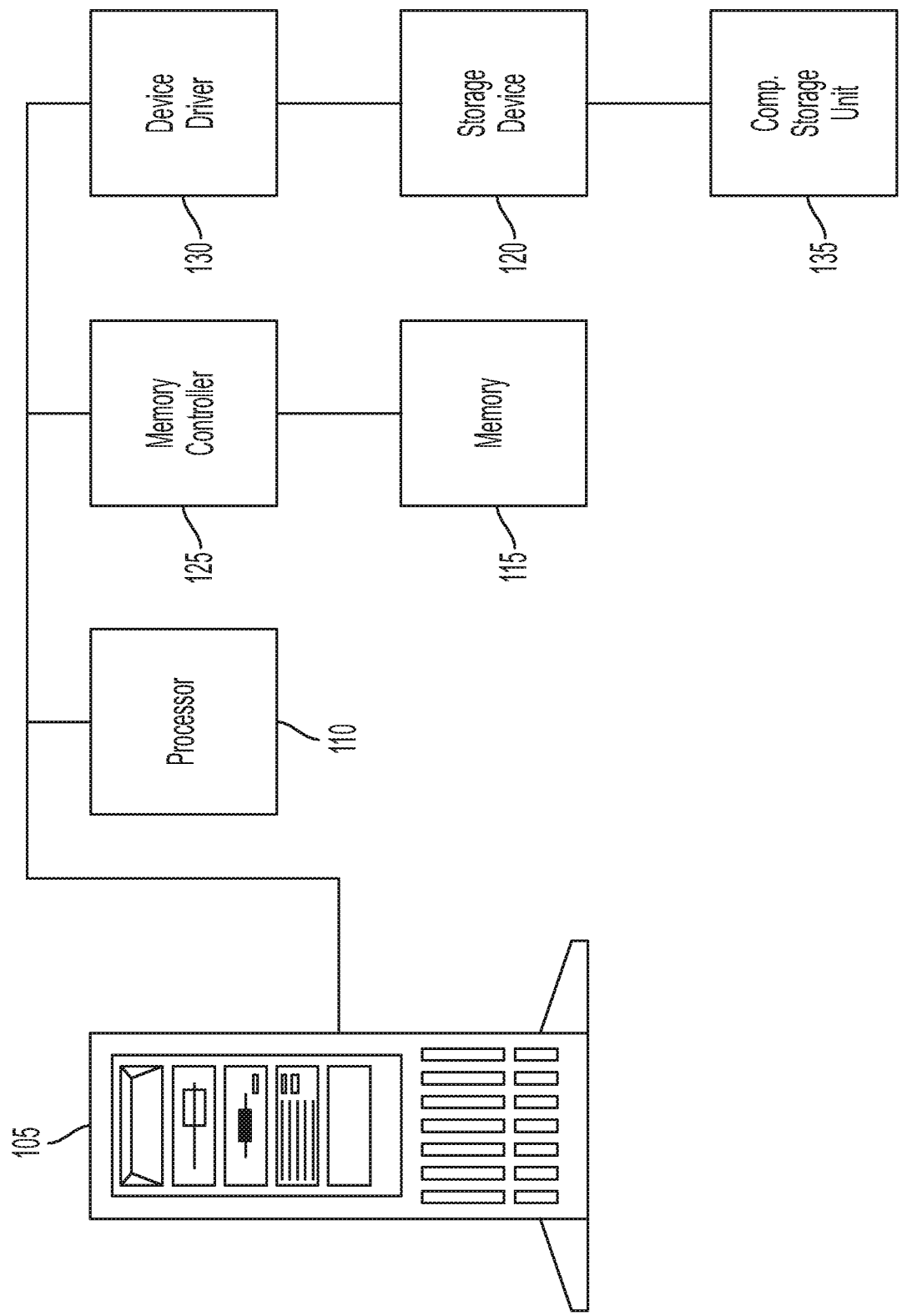
FIG. 1 shows a system including a computational storage unit that supports maintenance on a storage device, according to embodiments of the disclosure.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF VARIOUS EMBODIMENTS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

In various aspects, computational storage (CS) devices (also referred to as near-storage computing devices) can serve to enhance storage functionality uses, for example, by performing near-storage acceleration operations. CS devices can include storage element that provides functions known as computational storage functions (CSFs) and persistent data storage. Non-limiting examples of CSFs can include functions providing compression, encryption, Database filter, erasure coding, redundant array of inexpensive disks (RAID), hashing and cyclic redundancy check (CRC) operations, regular expression (RegEx) operations (e.g., for pattern matching), scatter gather, pipeline, video compression, data deduplication, and/or large data set management. Further, computational storage devices can include computational storage engines, which can include components (e.g., hardware components such as CPUs, FPGAs, etc.) that are able to execute one or more CSFs. In various aspects, the computational storage devices can communicate with and be controlled at least in part by another device such as a host. The host can include a computer system to which disks, disk subsystems, or file servers are attached and accessible for data storage and input/output (I/O).

In some respects, CS devices can serve to enhance various storage use cases by employing near-storage processing (e.g., performing computations on data proximate to the location of data being stored, for example, in the same device). For example, a storage device such as a solid-state device (SSD) with a computational element (e.g., a processor) can perform near data processing by processing various CS commands within the device. In some aspects, CS command processing may be done in part or in full by a host CPU in communication with a device such as a storage device, the computational storage device, or another associated compute device since configurations and applications can vary. In some cases, the CS commands can initiate one or more compute functions, which can run a compute operation on data provided as input to the function and can provide the results of the compute function as a result of performing the function. Such functions may be in the host CPU as a software function, in the device CPU as a software function or a hardware function.

In some respects, the disclosed embodiments can enable storage devices such as computational storage SSDs to identify compute functions in a methodical manner and can additionally enable the pairing of the devices with one or more in-device compute engines (e.g., hardware, firmware, and/or software based computational elements). Thus, the disclosed embodiments can enable various computational storage use-cases that have compute requirements, for example, those as specified by various standards bodies and/or user preferences.

In some respects, the devices described herein can include CS devices that have both persistent and volatile memory. In particular, the devices can include device local memory, which can include a staging and working area of device memory available for computational programs and/or supplementary usages of the main memory of the device. Further, the device local memory may be used entirely by the host or may be partially used by the host since it can be mapped in smaller allocation units to applications and virtual machines (VMs) in a virtualized environment. This VM allocated memory can be utilized in a manner in which it can be secured once freed by a host-based application or when the VM is terminated. Various embodiments of the disclosure further address such limitations by providing a standardized way to identify these functions and compute engines and provides mechanisms to manage the functions, compute engines, and associated memory and also to implement and use them in a CS device.

In various aspects, the disclosed systems can include a mechanism to clear the device local memory, and this mechanism can be at least partially managed by the host. Further, the disclosed systems can include an addressing mechanism for device memory not exposed to host by a physical address. The disclosed systems can include a mechanism for host software to discover such device memory mechanisms, and a mechanism to use and manage such device memory in the context of VMs in a virtualized environment. Additionally, the disclosed systems can include one or more CS devices (e.g., a SmartSSD™) that can implement such mechanisms and/or a software program that runs on the host or within the device that enable such mechanisms. Further, the disclosed systems can include one or more application program interfaces (APIs) and/or any other suitable communication technique for interfacing with these functions.

In various aspects, the disclosed systems can be used in connection with a variety of different devices including application-specific integrated circuits (ASICs), field-programmable gate arrays (FPGAs), and the like in addition to various software modules. The disclosed systems can operated at a system level (e.g., a host level) and at a more granular level (e.g., device level). At the host level, the disclosed systems can include a mechanism for grouping and mapping various functions to corresponding hardware elements (e.g., an FPGA, a data processing unit (DPU), a tensor processing unit (TPU), and the like) or various software modules (e.g., software modules written in Python or any other suitable programming language).

FIG. 1 shows a system including a computational storage unit that supports various functions (e.g., CSFs) on a storage device, according to embodiments of the disclosure. In FIG. 1, machine 105, which may also be termed a host or a system, may include processor 110, memory 115, and storage device 120. Processor 110 may be any variety of processor. (Processor 110, along with the other components discussed below, are shown outside the machine for ease of illustration; embodiments of the disclosure may include these components within the machine.) While FIG. 1 shows a single processor 110, machine 105 may include any number of processors, each of which may be single core or multi-core processors, each of which may implement a Reduced Instruction Set Computer (RISC) architecture or a Complex Instruction Set Computer (CISC) architecture (among other possibilities), and may be mixed in any desired combination.

Processor 110 may be coupled to memory 115. Memory 115 may be any variety of memory, such as flash memory, Dynamic Random Access Memory (DRAM), Static Random Access Memory (SRAM), Persistent Random Access Memory, Ferroelectric Random Access Memory (FRAM), or Non-Volatile Random Access Memory (NVRAM), such as Magnetoresistive Random Access Memory (MRAM) etc. Memory 115 may also be any desired combination of different memory types, and may be managed by memory controller 125. Memory 115 may be used to store data that may be termed "short-term": that is, data not expected to be stored for extended periods of time. Examples of short-term data may include temporary files, data being used locally by applications (which may have been copied from other storage locations), and the like.

Processor 110 and memory 115 may also support an operating system under which various applications may be running. These applications may issue requests (which may also be termed commands) to read data from or write data to either memory 115 or storage device 120. Storage device 120 may be accessed using device driver 130.

Storage device 120 may be associated with computational storage unit 135. As discussed below with reference to FIGS. 3A-3D, computational storage unit 135 may be part of storage device 120, or it may be separate from storage device 120. The phrase "associated with" is intended to cover both a storage device that includes a computational storage unit and a storage device that is paired with a computational storage unit that is not part of the storage device itself. In other words, a storage device and a computational storage unit may be said to be "paired" when they are physically separate devices but are connected in a manner that enables them to communicate with each other.

In addition, the connection between storage device 120 and paired computational storage unit 135 might enable the two devices to communicate, but might not enable one (or both) devices to work with a different partner: that is, storage device 120 might not be able to communicate with another computational storage unit, and/or computational storage unit 135 might not be able to communicate with another storage device. For example, storage device 120 and paired computational storage unit 135 might be connected serially (in either order) to a fabric such as a bus, enabling computational storage unit 135 to access information from storage device 120 in a manner another computational storage unit might not be able to achieve.

Processor 110 and storage device 120 may be connected to a fabric. The fabric may be any fabric along which information may be passed. The fabric may include fabrics that may be internal to machine 105, and which may use interfaces such as Peripheral Component Interconnect Express (PCIe), Serial AT Attachment (SATA), Small Computer Systems Interface (SCSI), among others. The fabric may also include fabrics that may be external to machine 105, and which may use interfaces such as Ethernet, InfiniBand, or Fibre Channel, among others. In addition, the fabric may support one or more protocols, such as Non-Volatile Memory (NVM) Express (NVMe), NVMe over Fabrics (NVMe-oF), or Simple Service Discovery Protocol (SSDP), among others. Thus, the fabric may be thought of as encompassing both internal and external networking connections, over which commands may be sent, either directly or indirectly, to storage device 120 (and more particularly, the computational storage unit associated with storage device 120).

While FIG. 1 shows one storage device 120 and one computational storage unit 135, there may be any number (one or more) of storage devices, and/or any number (one or more) of computational storage units in machine 105.

While FIG. 1 uses the generic term "storage device", embodiments of the disclosure may include any storage device formats that may benefit from the use of computational storage units, examples of which may include hard disk drives and Solid-State Drives (SSDs). Any reference to "SSD" below should be understood to include such other embodiments of the disclosure. In addition, while the discussion above (and below) focuses on storage device 120 as being associated with a computational storage unit, embodiments of the disclosure may extend to devices other than storage devices that may include or be associated with a computational storage unit. Any reference to "storage device" above (and below) may be understood as also encompassing other devices that might be associated with a computational storage unit.

The host may be implemented with any type of apparatus that may be configured as a host including, for example, a server such as a compute server, a storage server, storage node, a network server, and/or the like, a computer such as a workstation, a personal computer, a tablet, a smartphone, and/or the like, or any combination thereof. The device may be implemented with any type of apparatus that may be configured as a device including, for example, an accelerator device, a storage device, a network device, a memory expansion and/or buffer device, a graphics processing unit (GPU), a neural processing unit (NPU), a tensor processing unit (TPU), and/or the like, or any combination thereof.

Any communication between devices (e.g., host, CS device, and/or any intermediary device) can occur over an interface that may be implemented with any type of wired and/or wireless communication medium, interface, protocol, and/or the like including PCIe, NVMe, Ethernet, NVMe-oF, Compute Express Link (CXL), and/or a coherent protocol such as CXL.mem, CXL.cache, CXL.IO and/or the like, Gen-Z, Open Coherent Accelerator Processor Interface (OpenCAPI), Cache Coherent Interconnect for Accelerators (CCIX), Advanced eXtensible Interface (AXI) and/or the like, or any combination thereof, Transmission Control Protocol/Internet Protocol (TCP/IP), FibreChannel, InfiniB and, Serial AT Attachment (SATA), Small Computer Systems Interface (SCSI), Serial Attached SCSI (SAS), iWARP, any generation of wireless network including 2G, 3G, 4G, 5G, and/or the like, any generation of Wi-Fi, Bluetooth, near-field communication (NFC), and/or the like, or any combination thereof. In some embodiments, the communication interfaces may include a communication fabric including one or more links, buses, switches, hubs, nodes, routers, translators, repeaters, and/or the like. In some embodiments, the system illustrated herein may include one or more additional apparatus having one or more additional communication interfaces.

In an embodiment in which the device is implemented as a storage device, the storage device may include any type of nonvolatile storage media based, for example, on solid state media (e.g., a solid state drive (SSD)), magnetic media (e.g., a hard disk drive (HDD)), optical media, and/or the like, or any combination thereof. For example, in some embodiments, a storage device may be implemented as an SSD based on not-AND (NAND) flash memory, persistent memory such as cross-gridded nonvolatile memory, memory with bulk resistance change, phase change memory (PCM), and/or the like, or any combination thereof. Any such storage device may be implemented in any form factor such as 3.5-inch, 2.5-inch, 1.8-inch, M.2, Enterprise and Data Center SSD Form Factor (EDSFF), NF1, and/or the like, using any connector configuration such as SATA, SCSI, SAS, U.2, M.2, and/or the like. Any such storage device may be implemented entirely or partially with, and/or used in connection with, a server chassis, server rack, dataroom, datacenter, edge datacenter, mobile edge datacenter, and/or any combinations thereof.

Any of the functionality described herein, including any of the host functionality, device functionally, and/or the like, may be implemented with hardware, software, firmware, or any combination thereof including, for example, hardware and/or software combinational logic, sequential logic, timers, counters, registers, state machines, volatile memories such as dynamic random access memory (DRAM) and/or static random access memory (SRAM), nonvolatile memory including flash memory, persistent memory such as cross-gridded nonvolatile memory, memory with bulk resistance change, phase change memory (PCM), and/or the like and/or any combination thereof, complex programmable logic devices (CPLDs), field programmable gate arrays (FPGAs), application specific integrated circuits (ASICs) CPUs including complex instruction set computer (CISC) processors such as x86 processors and/or reduced instruction set computer (RISC) processors such as RISC-V and/or ARM processors), graphics processing units (GPUs), neural processing units (NPUs), tensor processing units (TPUs) and/or the like, executing instructions stored in any type of memory. In some embodiments, one or more components may be implemented as a system-on-chip (SOC).

FIG. 2 shows details of machine 105 of FIG. 1, according to embodiments of the disclosure. In FIG. 2, typically, machine 105 includes one or more processors 110, which may include memory controllers 125 and clocks 205, which may be used to coordinate the operations of the components of the machine. Processors 110 may also be coupled to memories 115, which may include random access memory (RAM), read-only memory (ROM), or other state preserving media, as examples. Processors 110 may also be coupled to storage devices 120, and to network connector 210, which may be, for example, an Ethernet connector or a wireless connector. Processors 110 may also be connected to buses 215, to which may be attached user interfaces 220 and Input/Output (I/O) interface ports that may be managed using I/O engines 225, among other components.

Figure 3A:
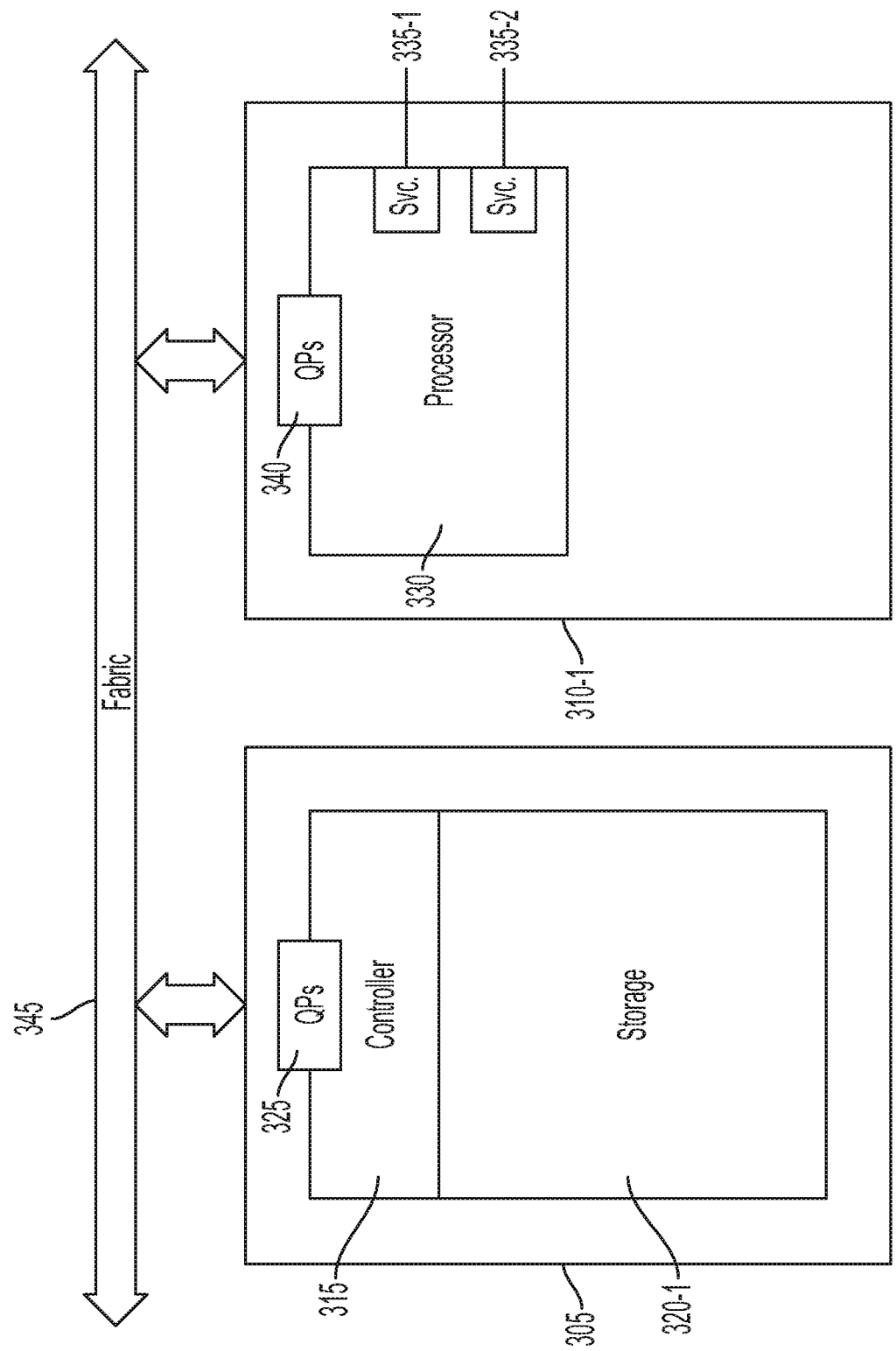
FIG. 3A shows a first example arrangement of a computational storage unit that may be associated with the storage device of FIG. 1, according to embodiments of the disclosure.

FIGS. 3A-3D show various arrangements of computational storage unit 135 of FIG. 1 (which may also be termed a "computational device" or "device") that may be associated with storage device 120 of FIG. 1, according to embodiments of the disclosure. In FIG. 3A, storage device 305 and computational device 310-1 are shown. Storage device 305 may include controller 315 and storage 320-1, and may be reachable across queue pairs. Queue pairs 325 may be used both for management of storage device 305 and to control I/O of storage device 305.

Computational device 310-1 may be paired with storage device 305. Computational device 310-1 may include any number (one or more) processors 330, which may offer one or more services 335-1 and 335-2. To be clearer, each processor 330 may offer any number (one or more) services 335-1 and 335-2 (although embodiments of the disclosure may include computational device 310-1 including exactly two services 335-1 and 335-2). Each processor 330 may be a single core processor or a multi-core processor. Computational device 310-1 may be reachable across queue pairs 340, which may be used for both management of computational device 310-1 and/or to control I/O of computational device 310-1

Processor(s) 330 may be thought of as near-storage processing: that is, processing that is closer to storage device 305 than processor 110 of FIG. 1. Because processor(s) 330 are closer to storage device 305, processor(s) 330 may be able to execute commands on data stored in storage device 305 more quickly than for processor 110 of FIG. 1 to execute such commands. While not shown in FIG. 3A, processor(s) 330 may have associated memory which may be used for local execution of commands on data stored in storage device 305. This associated memory may include local memory similar to memory 115 of FIG. 1, on-chip memory (which may be faster than memory such as memory 115, but perhaps more expensive to produce), or both.

While FIG. 3A shows storage device 305 and computational device 310-1 as being separately reachable across fabric 345, embodiments of the disclosure may also include storage device 305 and computational device 310-1 being serially connected (as shown in FIG. 1). That is, commands directed to storage device 305 and computational device 310-1 might both be received at the same physical connection to fabric 345 and may pass through one device to reach the other. For example, if computational device 310-1 is located between storage device 305 and fabric 345, computational device 310-1 may receive commands directed to both computational device 310-1 and storage device 305. Computational device 310-1 may process commands directed to computational device 310-1, and may pass commands directed to storage device 305 to storage device 305. Similarly, if storage device 305 is located between computational device 310-1 and fabric 345, storage device 305 may receive commands directed to both storage device 305 and computational device 310-1. Storage device 305 may process commands directed to storage device 305 and may pass commands directed to computational device 310-1 to computational device 310-1.

Services 335-1 and 335-2 may offer a number of different functions (e.g., CSFs) that may be executed on data stored in storage device 305. For example, services 335-1 and 335-2 may offer pre-defined functions, such as encryption, decryption, compression, and/or decompression of data, erasure coding, and/or applying regular expressions. Or, services 335-1 and 335-2 may offer more general functions, such as data searching and/or SQL functions. Services 335-1 and 335-2 may also support running application-specific code. That is, the application using services 335-1 and 335-2 may provide custom code to be executed using data on storage device 305. Services 335-1 and 335-2 may also any combination of such functions. Table 1 lists some examples of services that may be offered by processor(s) 330.

TABLE 1

Service Types

Compression
Encryption
Database filter
Erasure coding
RAID
Hash/CRC
RegEx (pattern matching)
Scatter Gather
Pipeline
Video compression
Data deduplication
Operating System Image Loader
Container Image Loader
Berkeley packet filter (BPF) loader
FPGA Bitstream loader
Large Data Set Processor(s) 330 (and, indeed, computational device 310-1) may be implemented in any desired manner. Example implementations may include a local processor, such as Central Processing Unit (CPU) or some other processor, a Graphics Processing Unit (GPU), a General Purpose GPU (GPGPU), a Data Processing Unit (DPU), a Tensor Processing Unit (TPU), or a Neural Processing Unit (NPU), among other possibilities. Processor(s) 330 may also be implemented using a Field Programmable Gate Array (FPGA) or an Application-Specific Integrated Circuit (ASIC), among other possibilities. If computational device 310-1 includes more than one processor 330, each processor may be implemented as described above. For example, computational device 310-1 might have one each of CPU, TPU, and FPGA, or computational device 310-1 might have two FPGAs, or computational device 310-1 might have two CPUs and one ASIC, etc.

Depending on the desired interpretation, either computational device 310-1 or processor(s) 330 may be thought of as a computational storage unit.

Whereas FIG. 3A shows storage device 305 and computational device 310-1 as separate devices, in FIG. 3B they may be combined. Thus, computational device 310-2 may include controller 315, storage 320-1, and processor(s) 330 offering services 335-1 and 335-2. As with storage device 305 and computational device 310-1 of FIG. 3A, management and I/O commands may be received via queue pairs 340. Even though computational device 310-2 is shown as including both storage and processor(s) 330, FIG. 3B may still be thought of as including a storage device that is associated with a computational storage unit.

Figure 3C:
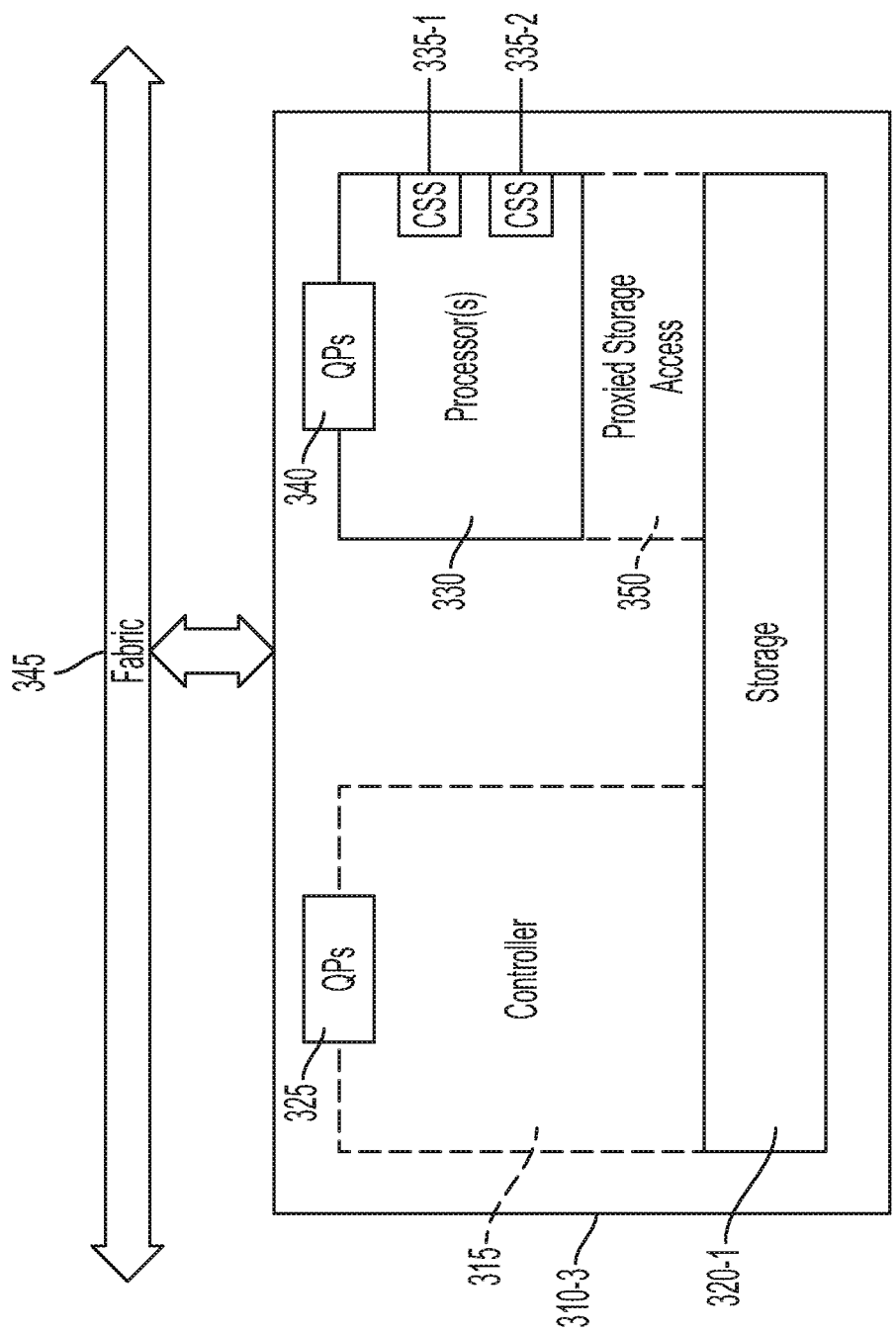
FIG. 3C shows a third example arrangement of a computational storage unit that may be associated with the storage device of FIG. 1, according to embodiments of the disclosure.

In yet another variation shown in FIG. 3C, computational device 310-3 is shown. Computational device 310-3 may include controller 315 and storage 320-1, as well as processor(s) 330 offering services 335-1 and 335-2. But even though computational device 310-3 may be thought of as a single component including controller 315, storage 320-1, and processor(s) 330 (and also being thought of as a storage device associated with a computational storage unit), unlike the implementation shown in FIG. 3B controller 315 and processor(s) 330 may each include their own queue pairs 325 and 340 (again, which may be used for management and/or I/O). By including queue pairs 325, controller 315 may offer transparent access to storage 320-1 (rather than requiring all communication to proceed through processor(s) 330).

In addition, processor(s) 330 may have proxied storage access 350 to storage 320-1. Thus, instead of routing access requests through controller 315, processor(s) 330 may be able to directly access the data from storage 320-1.

In FIG. 3C, both controller 315 and proxied storage access 350 are shown with dashed lines to represent that they are optional elements, and may be omitted depending on the implementation.

Figure 3D:
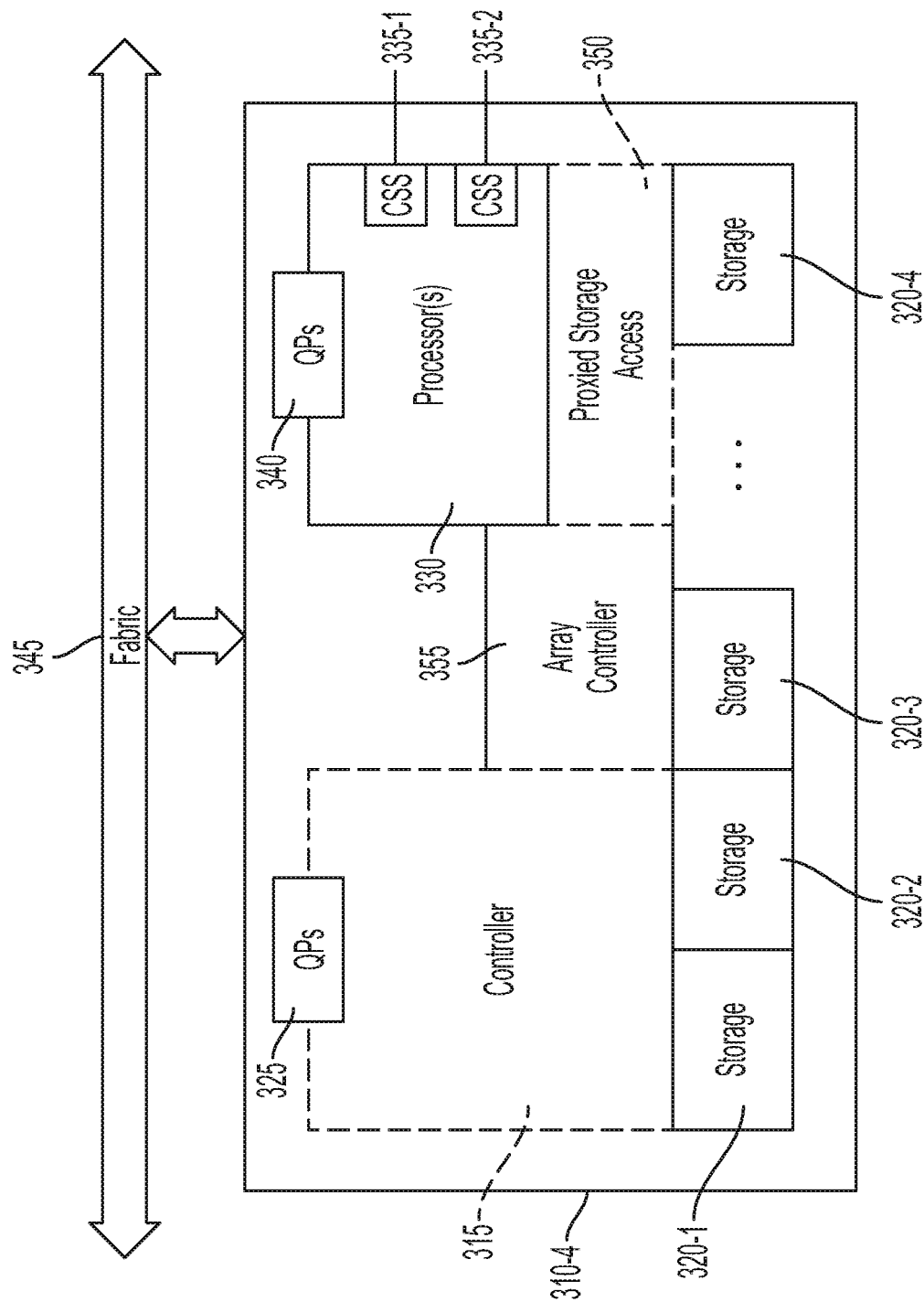
FIG. 3D shows a fourth example arrangement of a computational storage unit that may be associated with the storage device of FIG. 1, according to embodiments of the disclosure.

Finally, FIG. 3D shows yet another implementation. In FIG. 3D, computational device 310-4 is shown, which may include controller 315 and proxied storage access 350 similar to FIG. 3C. In addition, computational device 310-4 may include an array of one or more storage 320-1 through 320-4. While FIG. 3D shows four storage elements, embodiments of the disclosure may include any number (one or more) of storage elements. In addition, the individual storage elements may be other storage devices, such as those shown in FIGS. 3A-3D.

Because computational device 310-4 may include more than one storage element 320-1 through 320-4, computational device 310-4 may include array controller 355. Array controller 355 may manage how data is stored on and retrieved from storage elements 320-1 through 320-4. For example, if storage elements 320-1 through 320-4 are implemented as some level of a Redundant Array of Independent Disks (RAID), array controller 355 may be a RAID controller. If storage elements 320-1 through 320-4 are implemented using some form of Erasure Coding, then array controller 355 may be an Erasure Coding controller.

In some embodiments, one or more computational storage (CS) application programming interfaces (APIs) may provide a query mechanism, for example, to discover one or more compute functions in a device that may be preloaded by a provider, downloaded later by a user, or used in any other manner. A list of these functions may be provided to a user and described, for example, using a list of function IDs. Additional query functionality may be provided, for example, details on one or more functions, input and/or output parameters and/or status values for the function, and/or the like. One or more APIs may be used by the disclosed systems to communicate with computational storage devices that are equipped with these functions and have the ability to initialize, execute, stop, reset, download, load, and/or unload these functions and/or the like. In some situations, the same function may be resident on one or more devices at the same time. One or more APIs may provide the classification to differentiate functions and/or their features at the query and/or execution level.

Figure 4:
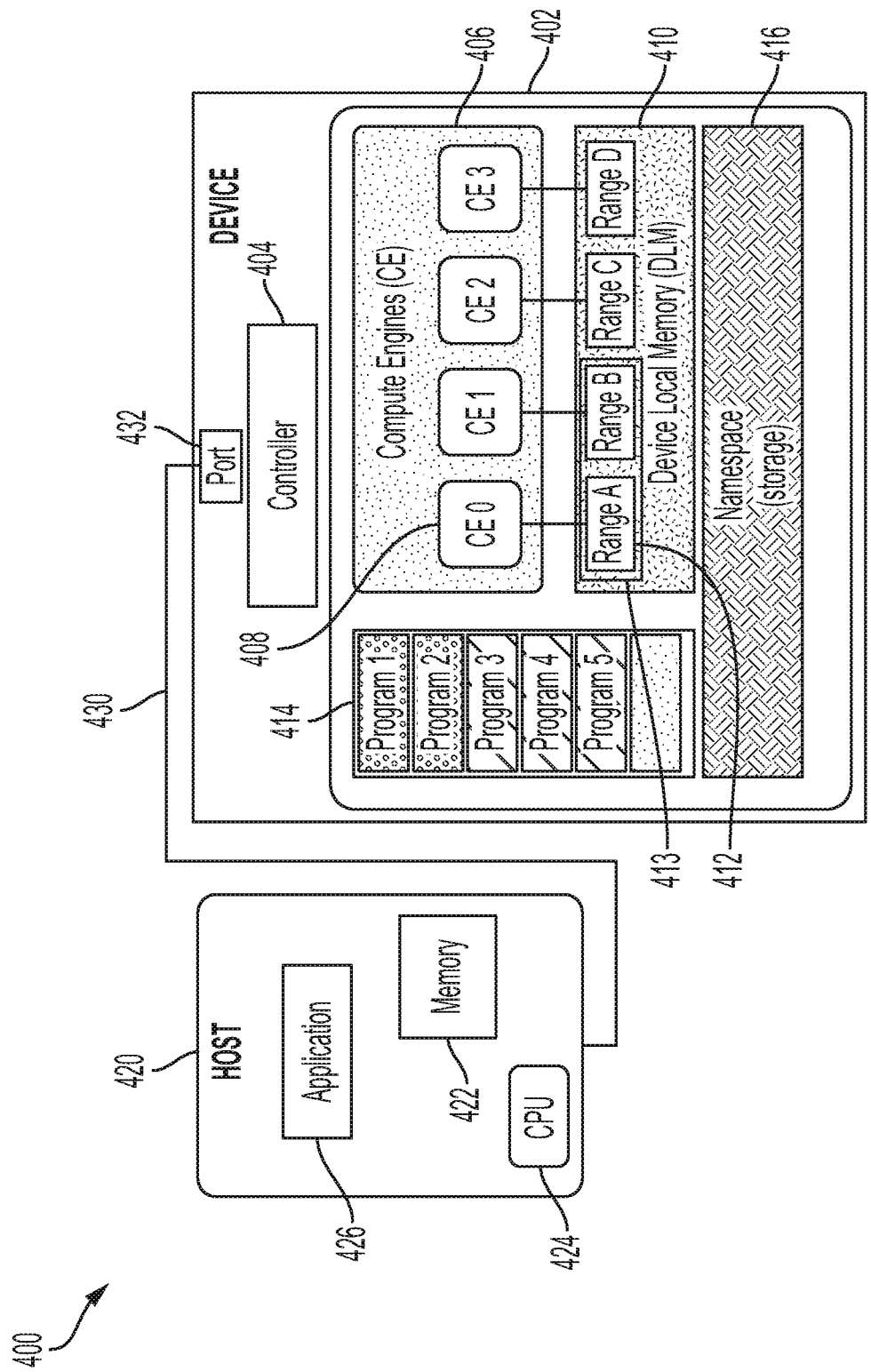
FIG. 4 shows a schematic diagram of an example device local memory, according to embodiments of the disclosure.

FIG. 4 shows a schematic diagram of managing device local memory, in accordance with example embodiments of the disclosure. In particular, diagram 400 shows a system including a device 402 (e.g., a CS device) that can include a controller 404 configured to provide access to device memory and compute resources, various computing engines (CEs) 406, device local memory (DLM) 410, a namespace 416 that can be connected to storage (e.g., persistent storage), and various CS programs 414 that can be configured to process data stored on the device (e.g., data stored on DLM and/or storage). Further shown is a host 420 in communication with the device 402; the host 420 can include a central processing unit (CPU) 424 (or similar processing element), memory 422, and at least one application 426. The host 420 can further be connected 430 to the device 402 at a port 432. As noted, the disclosed systems at least partially depicted in diagram 400 can include various elements that can perform various tasks such as a task to clear device memory; in some respects, the clearing of the device memory can be at least partially managed by the host 420, as further described below.

In various aspects, the disclosed systems can support certain storage protocols (e.g., non-volatile memory express, NVMe), which can include a memory type such as a Device Local Memory (DLM) for use by computational storage and for future use cases that may not involve computational storage elements. As shown in diagram 400, DLM 410 can be allocated in ranges (e.g., Range A, Range B, Range C, and Range D shown in the DLM 410 of diagram 400) that can be associated to different compute engines (CE) 406. In some respects, such CEs 406 (e.g., CE 408) and corresponding memory ranges (e.g., memory range A 412) may be further allocated to a host application 426 in a host 420 environment (or in a VM/container in a virtualized environment, not shown).

In some aspects, the memory (e.g., DLM 410) may be used as a source or a destination for data communicated between the host 420, local storage (e.g., NAND flash memory and/or namespace 416), and/or a CS program 414 (e.g., a CS program running on device 402). In other aspects, the memory (e.g., DLM 410) may be used between namespaces 416 for specific operations including, but not limited to, copy, defragmentation, alignment, combinations thereof, and/or the like. In certain respects, the use case may be entirely contained within the device 402. In other respects, the memory (e.g., DLM 410) may also be used for security-related purposes such as hosting keys (e.g., encryption-related keys) that need to be secured. In some ways, the memory may be used as an intermediate buffer for backup operations associated with any suitable device (e.g., device 402 and/or host 420) using the disclosed systems. In other respects, the memory may be shared with an external device such as an adapter (not shown) that manages network, storage, security, and/or related operations.

In some aspects, the memory (e.g., DLM 410) may be used by one or more operations (e.g., host-initiated operations based on application 426) at different times. Between usages of this memory for different operations, the disclosed systems can clear the memory (e.g., the DLM 410), for example, to prevent leakage of potentially sensitive data after operation, as discussed further below. Moreover, while the memory (e.g., DLM 410) could be cleared by transferring blank data from the host 420 or local storage (e.g., namespace 416 based local storage) to the memory (e.g., DLM 410) such an operation may consume resources that could be used for other purposes.

In some respects, the disclosed systems can clear the data in the DLM 410. The clearing of data in DLM 410 can include erasing the existing contents of the DLM 410 (e.g., replacing each byte with zeros). In some aspects, the disclosed systems can chose the replacement byte to be any byte value that is repeated across the entire memory range. In other aspects, the disclosed systems can conduct the clearing of data in a secure manner (e.g., such that the operation is not in the direct path of the caller so as to avoid timing-based attacks).

In some aspects, the disclosed systems can clear the data from the DLM 410 in several ways. In a first example, the disclosed systems can target the clearing of the data by targeting one or more memory ranges (e.g., memory range A 412) in the memory local to the controller 404. For example, ranges A, B, C and D in diagram 400 may be targeted (e.g., by the host 420 and/or the device 402) for clearing. In another example, the disclosed systems can create a memory range set including multiple memory ranges and can send a command to the controller 404 to request that the specified memory range set (e.g., memory range set 413) be cleared. Further, the memory range set (e.g., memory range set 413) can have multiple ranges in it that is also associated with one or more CEs (e.g., CE 0 and CE 1 in diagram 400). In some aspects, the disclosed systems can perform such a technique when multiple ranges are to be cleared.

In some aspects, the disclosed systems can provide an addressing mechanism for device memory not exposed to the host as a physical address, as described further below. In some respects, the disclosed systems can characterize and/or define the DLM differently in the context of certain specifications (e.g., NVMe, NVMe-oF, etc.). Accordingly, a given device (e.g., device 402) can virtualize the backing physical media (e.g., DLM 410 and/or storage 412), and present such physical media to and as defined by a vendor. Thus, the disclosed systems can use an abstraction layer (e.g., a software-based layer) to meet one or more requirements of a specification while hiding specific implementations from vendors and details taken to build and optimize the device's 402 DLM 410 operational flows in executing various commands. As shown in diagram 400, the DLM 410 may be virtually addressed. Thus, any suitable method can be implemented for mapping the underlying physical memory to the defined memory ranges (e.g., range A 412) in a memory region of the DLM 410.

In some respects, if the memory (e.g., DLM 410) is virtually addressed, the disclosed systems can operate as follows. Upon a first occurrence of assigning a memory range (e.g., range A 412) with a given command (e.g., a create Memory Range Set command), the physical memory in the DLM 410 can be allocated and mapped to the specified memory range. Before that, the disclosed systems can allow the memory (e.g., DLM 410) to be contained without any mapping (e.g., the disclosed systems may permit the creation of a virtual mapping of the memory for use after a command to allocate a range or create a memory range set). The disclosed systems can then back physical memory to the virtual address and can thus make the physical memory available to programs and other usages. Further, in some respects, the disclosed systems can permit the release of the physical memory on various events including, but not limited to: clearing of the memory as described above, deleting a memory range using the appropriate device command, and/or freeing DLM 410 back to the pool on the host (e.g., host 420). In some aspects, the release operation may be triggered by one or more applications in the host 420 or when VMs/containers are terminated.

In some aspects, since the underlying physical memory may be setup and structured in any way that a given user (e.g., a vendor) chooses, the disclosed systems can set up and use an abstraction layer to provide a mechanism to unite disparate memory types as needed and present them as one pool to a device (e.g., device 402 of FIG. 4). Further, the disclosed systems can permit the application of memory (e.g., DLM 410 of FIG. 4) to a specific usage to enable the customization of the specific memory type, channel, slot, and/or the like to a given use case using a corresponding virtualization layer. The disclosed systems permit a device to perform various operations such as hiding certain memory deficiencies (e.g., unusable physical or virtual memory), enable the use of scattered memory (memory not in one contiguous segment), and to enable the use of special-purpose memory types.

In some aspects, the disclosed systems can create a device memory range (e.g., range A 412 of DLM 410 of diagram 400) when a corresponding device command is issued (e.g., from host 420 and received by device 402 at controller 404). With the creation of a memory range, the disclosed systems can permit the device to provide a mechanism to guarantee that data in the range to only be accessed by the virtual address mapping into the requested program's memory or the caller's command context. Accordingly, data housed in that memory range may be treated as secure. Secure data can have several use cases. For example, secure data may be required by default in a multi-tenant environment, placing security-based keys (e.g., in encryption applications), sensitive data, combinations thereof, and/or the like.

The embodiment illustrated in diagram 400 may be used, for example, with a storage protocol such as Nonvolatile Memory Express (NVMe) which may use an interconnect such as Peripheral Component Interconnect Express (PCIe) and/or NVMe-over-fabric (NVMe-oF) which may use a network such as Ethernet, but the principles are not limited to these protocols, communication techniques, or any other implementation details.

FIG. 5 shows another schematic diagram of an example memory command, according to embodiments of the disclosure. In particular, diagram 500 shows a Memory Range Clear Command that can be used to clear memory in the DLM, as described above. Diagram 500 further shows the specific bytes 502 and their corresponding description 504 for this particular example command. For example, bits 127:104 are reserved, bits 103:96 refer to the memory clear byte (MCB) which denotes the byte to be used to clear the memory with (with the default being set to '0'). Further, bits 95:64 are dedicated to the memory range length (MRL) which denotes the length of the memory range from MRS to clear. Moreover, bits 63:00 denote memory range start (MRS), which represents a field that specifies the start of the memory range that needs to be cleared.

Figure 6:
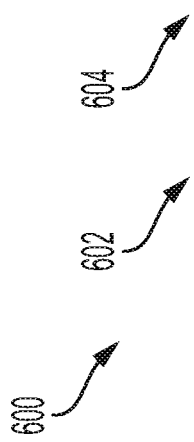
FIG. 6 shows a schematic diagram of another example memory command, according to embodiments of the disclosure.

FIG. 6 shows another schematic diagram of an example memory command, according to embodiments of the disclosure. In particular, diagram 600 shows a Memory Range Set Clear Command that can be used to clear memory in the DLM using a host data pointer, as described above. Diagram 600 further shows the specific bytes 602 and their description 604 for this particular example command. For example, bytes 602 03:00 can represent the total ranges in the set (TRS) which can specify the total number of memory ranges contained in the memory range set specified in the host buffer (which can be associated with certain protocols such as the NVMe base specification and related physical range pages (PRPs) and scatter gather lists (SGLs)). In some respects, bits 31:04 can be reserved, and the remaining bit ranges can be associated with consecutive memory ranges (e.g., memory range 0, memory range 1, etc.).

Figure 7:
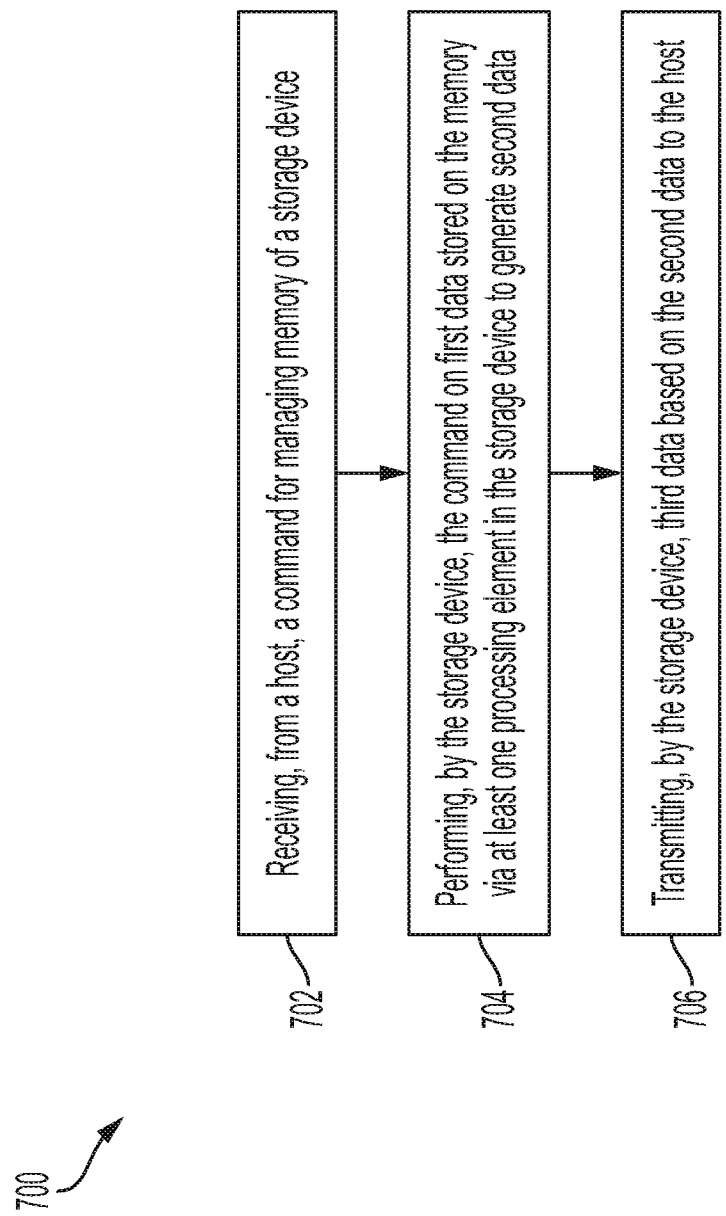
FIG. 7 is an illustration of an exemplary operational flow illustrating example operations associated with the disclosed systems, in accordance with example embodiments of the disclosure.

FIG. 7 shows a representative flow chart 700 illustrating some example operations associated with the disclosed systems, in accordance with embodiments of the disclosure. At block 702, the disclosed systems can receive, from a host, a command for managing memory. In some aspects, the command can include an operation to set at least a portion of first data to a predetermined bit (e.g., zero), At block 704, the disclosed systems can perform, via the storage device, the command on first data stored on the memory via at least one processing element in the storage device to generate second data. In some aspects, the command can also trigger actions including dedicating a portion of virtualized memory for a first operation or for a first duration (e.g., reserving a portion of memory to a particular task for a given period of time). At block 706, the disclosed systems can transmit, via the storage device, third data based on the second data to the host. In some aspects, the third data can include a completion indication (e.g., an acknowledgement message).

Figure 8:
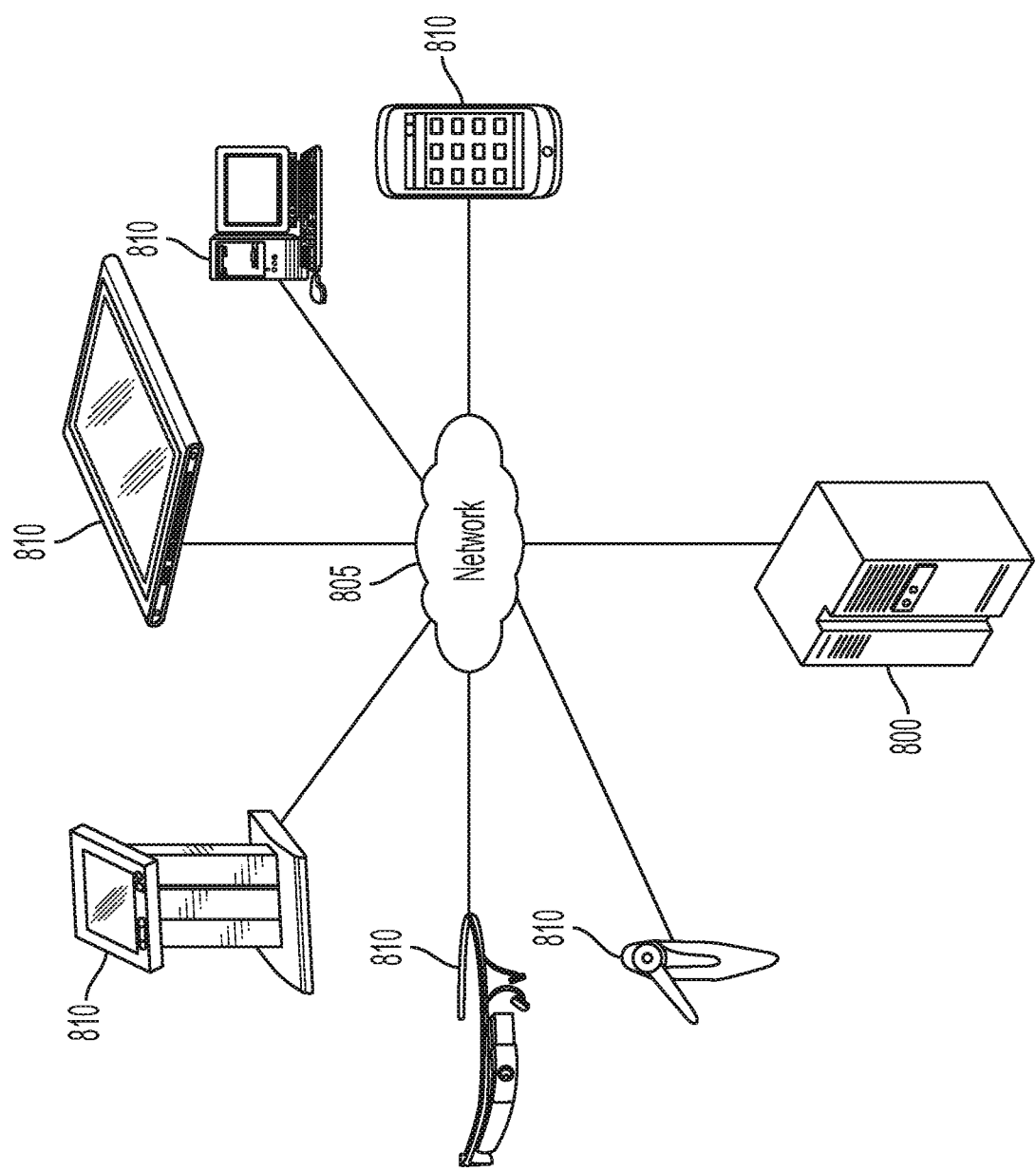
FIG. 8 shows an example schematic diagram of a system that can be used to practice embodiments of the present disclosure.

FIG. 8 shows an example schematic diagram of a system that can be used to practice embodiments of the present disclosure. As shown in FIG. 8, this particular embodiment may include one or more management computing entities 800, one or more networks 805, and one or more user devices 810 (e.g., host devices, storage devices, additional devices, etc.). In various embodiments, the management computing entities 800 can be configured to run operations associated with the disclosed systems and associated embodiments described throughout the disclosure, including, but not limited to, those described in connection with the example operations in FIG. 7. Further, the management computing entities 800 can reside in any suitable portion of the disclosed systems (e.g., such as a storage device manager, host application, a remote host, another device, combinations thereof, and/or the like). Each of these components, entities, devices, systems, and similar words used herein interchangeably may be in direct or indirect communication with, for example, one another over the same or different wired or wireless networks. Additionally, while FIG. 8 illustrates the various system entities as separate, standalone entities, the various embodiments are not limited to this particular architecture. As noted, the communications can be performed using any suitable protocols described further herein.

Figure 9:
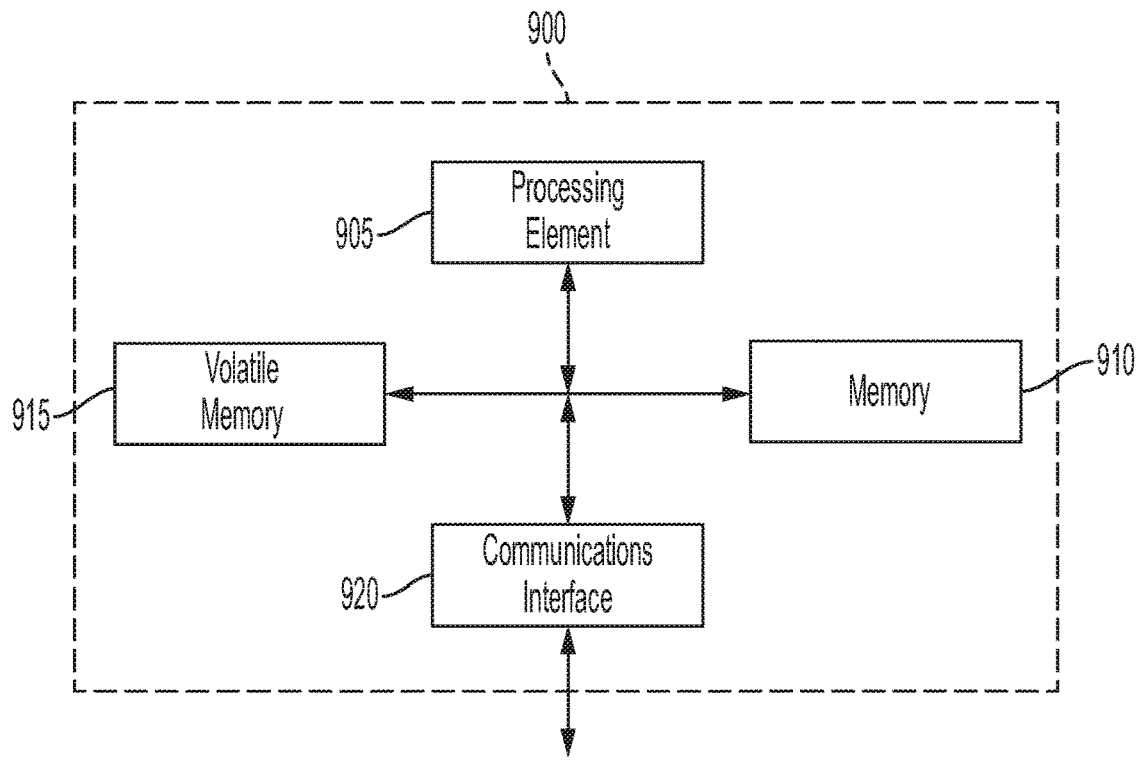
FIG. 9 shows an example schematic diagram of a management computing entity, in accordance with example embodiments of the disclosure.

FIG. 9 shows an example schematic diagram 900 of a management computing entity, in accordance with example embodiments of the disclosure. As noted, the management computing entity can be configured to run operations associated with the disclosed systems and associated embodiments described throughout the disclosure. Further, the management computing entities 800 can reside in any suitable portion of the disclosed systems. In particular, a content component may serve to determine signals indicative of data (e.g., video, audio, text, data, combinations thereof, and/or the like) to be transmitted over the system described herein. In another embodiment, the determination of the signal for transmission may be, for example, based on a user input to a device, a predetermined schedule of data transmissions on a network associated with the system, changes in network conditions, and the like. In one embodiment, the signal may include that data may be encapsulated in a data frame and/or packet that is configured to be sent from a device to one or more devices on the network.

In another embodiment, the processing element 905 may serve to determine various parameters associated with data transmitted over the network associated with the disclosed systems. As another example, the processing element 905 may serve perform various acceleration operations such as at least portions of an offload functionality, data pre- or post-processing, combinations thereof, and/or the like.

In one embodiment, a transmitting component (not shown) may serve to transmit the signal from one device to another device on the network. For example, the transmitting component may serve to prepare a transmitter (e.g., transmitter 1004 of FIG. 10, below) to transmit the signal over the network. For example, the transmitting component may queue data in one or more buffers, may ascertain that the transmitting device and associated transmitters are functional and have adequate power to transmit the signal over the network, may adjust one or more parameters (e.g., modulation type, signal amplification, signal power level, noise rejection, combinations thereof, and/or the like) associated with the transmission of the data.

In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles (for example Xbox, Play Station, Wii), watches, glasses, iBeacons, proximity beacons, key fobs, radio frequency identification (RFID) tags, ear pieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the management computing entity 800 may also include one or more communications interfaces 920 for communicating with various computing entities, such as by communicating data, content, information, and/or similar terms used herein interchangeably that can be transmitted, received, operated on, processed, displayed, stored, and/or the like. For instance, the management computing entity 800 may communicate with user devices 610 and/or a variety of other computing entities.

As shown in FIG. 9, in one embodiment, the management computing entity 800 may include or be in communication with one or more processing elements 905 (also referred to as processors, processing circuitry, and/or similar terms used herein interchangeably) that communicate with other elements within the management computing entity 800 via a bus, for example. As will be understood, the processing element 905 may be embodied in a number of different ways. For example, the processing element 905 may be embodied as one or more complex programmable logic devices (CPLDs), microprocessors, multi-core processors, coprocessing entities, application-specific instruction-set processors (ASIPs), microcontrollers, and/or controllers. Further, the processing element 905 may be embodied as one or more other processing devices or circuitry. The term circuitry may refer to an entirely hardware embodiment or a combination of hardware and computer program products. Thus, the processing element 905 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 905 may be configured for a particular use or configured to execute instructions stored in volatile or non-volatile media or otherwise accessible to the processing element 905. As such, whether configured by hardware or computer program products, or by a combination thereof, the processing element 905 may be capable of performing steps or operations according to embodiments of the present disclosure when configured accordingly.

In one embodiment, the management computing entity 800 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 910, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program components, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity—relationship model, object model, document model, semantic model, graph model, and/or the like.

In one embodiment, the management computing entity 800 may further include or be in communication with volatile media (also referred to as volatile storage, memory, memory storage, memory circuitry and/or similar terms used herein interchangeably). In one embodiment, the volatile storage or memory may also include one or more volatile storage or memory media 915, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program components, scripts, source code, object code, byte code, compiled code, interpreted code, machine code, executable instructions, and/or the like being executed by, for example, the processing element 905. Thus, the databases, database instances, database management systems, data, applications, programs, program components, scripts, source code, object code, byte code, compiled code, interpreted code, machine code, executable instructions, and/or the like may be used to control certain aspects of the operation of the management computing entity 800 with the assistance of the processing element 905 and operating system.

As indicated, in one embodiment, the management computing entity 800 may also include one or more communications interfaces 920 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as peripheral component interconnect express (PCIe), fiber distributed data interface (FDDI), Small Computer System Interface (SCSI), digital subscriber line (DSL), Ethernet, asynchronous transfer mode (ATM), frame relay, data over cable service interface specification (DOCSIS), or any other wired transmission protocol. Similarly, the management computing entity 800 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, ZigBee, Bluetooth protocols, 5G protocol, wireless universal serial bus (USB) protocols, and/or any other wireless protocol.

Although not shown, the management computing entity 800 may include or be in communication with one or more input elements, such as a keyboard input, a mouse input, a touch screen/display input, motion input, movement input, audio input, pointing device input, joystick input, keypad input, and/or the like. The management computing entity 800 may also include or be in communication with one or more output elements (not shown), such as audio output, video output, screen/display output, motion output, movement output, and/or the like.

As will be appreciated, one or more of the management computing entity's 800 components may be located remotely from other management computing entity 800 components, such as in a distributed system. Furthermore, one or more of the components may be combined and additional components performing functions described herein may be included in the management computing entity 800. Thus, the management computing entity 800 can be adapted to accommodate a variety of needs and circumstances. As will be recognized, these architectures and descriptions are provided for example purposes only and are not limiting to the various embodiments.

A user may be an individual, a family, a company, an organization, an entity, a department within an organization, a representative of an organization and/or person, and/or the like. In one example, users may be employees, residents, customers, and/or the like. For instance, a user may operate a user device 810 that includes one or more components that are functionally similar to those of the management computing entity 800.

In various aspects, the processing component, the transmitting component, and/or the receiving component (not shown) may be configured to operate on one or more devices and may include aspects of the functionality of the management computing entity 800, as shown and described in connection with FIGS. 8 and 9 here. In particular, the processing component, the transmitting component, and/or the receiving component may be configured to be in communication with one or more processing elements 905, memory 910, volatile memory 915, and may include a communication interface 920 (e.g., to facilitate communication between devices).

Figure 10:
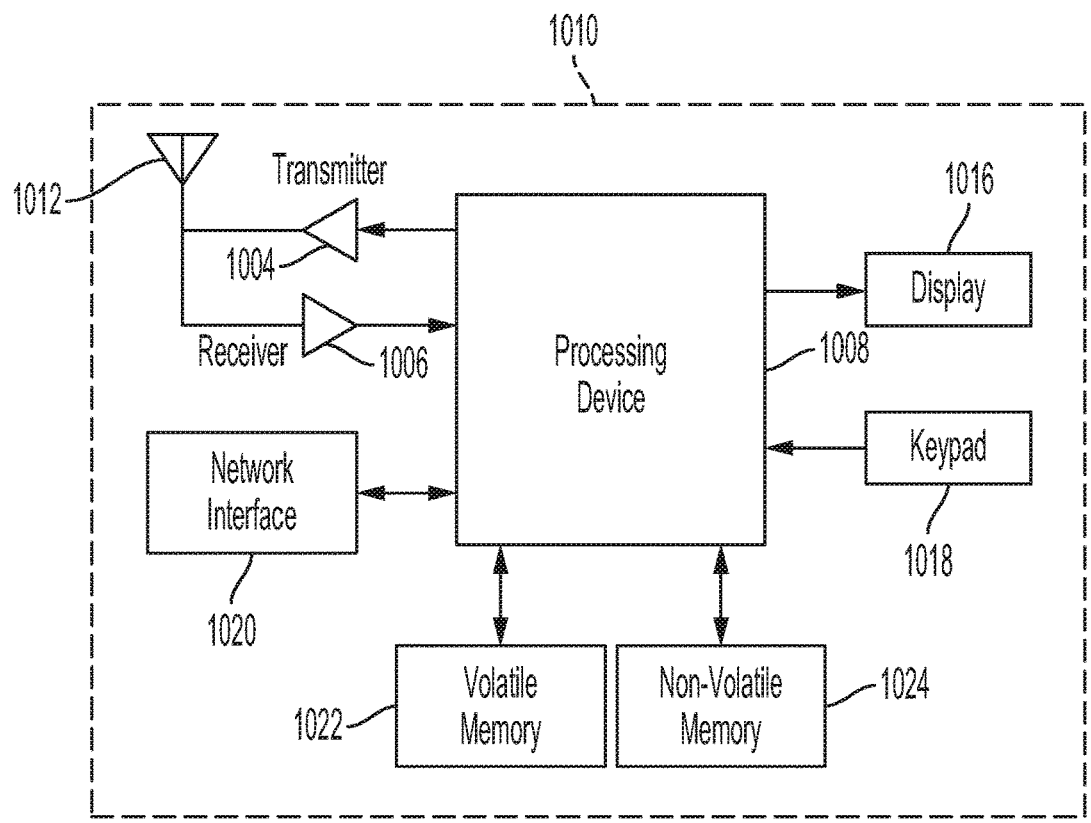
FIG. 10 shows an example schematic diagram of a user device, in accordance with example embodiments of the disclosure.

FIG. 10 shows an example schematic diagram of a user device, in accordance with example embodiments of the disclosure. FIG. 10 provides an illustrative schematic representative of a user device 1010 (e.g., a host device, a storage device, a peripheral device, etc.) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles (for example Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User devices 1010 can be operated by various parties. As shown in FIG. 10, the user device 1010 can include an antenna 1012, a transmitter 1004 (for example radio), a receiver 1006 (for example radio), and a processing element 1008 (for example CPLDs, FPGAs, microprocessors, multi-core processors, coprocessing entities, ASIPs, microcontrollers, and/or controllers) that provides signals to and receives signals from the transmitter 1004 and receiver 1006, respectively.

The signals provided to and received from the transmitter 1004 and the receiver 1006, respectively, may include signaling information in accordance with air interface standards of applicable wireless systems. In this regard, the user device 1010 may be capable of operating with one or more air interface standards, communication protocols, modulation types, and access types. More particularly, the user device 1010 may operate in accordance with any of a number of wireless communication standards and protocols, such as those described above with regard to the management computing entity 800 of FIG. 8. In a particular embodiment, the user device 1010 may operate in accordance with multiple wireless communication standards and protocols, such as the disclosed IoT DOCSIS protocol, UMTS, CDMA2000, 1×RTT, WCDMA, TD-SCDMA, LTE, E-UTRAN, EVDO, HSPA, HSDPA, 5G, Wi-Fi, Wi-Fi Direct, WiMAX, UWB, IR, NFC, Bluetooth, USB, and/or the like. Similarly, the user device 1010 may operate in accordance with multiple wired communication standards and protocols, such as those described above with regard to the management computing entity 800 via a network interface 1020.

Via these communication standards and protocols, the user device 1010 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Component Dialer (SIM dialer). The user device 1010 can also download changes, add-ons, and updates, for instance, to its firmware, software (for example including executable instructions, applications, program components), and operating system.

According to one embodiment, the user device 1010 may include location determining aspects, devices, components, functionalities, and/or similar words used herein interchangeably. The location determining aspects may be used to inform the models used by the management computing entity and one or more of the models and/or machine learning techniques described herein. For example, the user device 1010 may include outdoor positioning aspects, such as a location component adapted to acquire, for example, latitude, longitude, altitude, geocode, course, direction, heading, speed, universal time (UTC), date, and/or various other information/data. In one embodiment, the location component can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user device's 1010 position in connection with a variety of other systems, including cellular towers, Wi-Fi access points, and/or the like. Similarly, the user device 1010 may include indoor positioning aspects, such as a location component adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (for example smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The user device 1010 may also comprise a user interface (that can include a display 1016 coupled to a processing element 1008) and/or a user input interface (coupled to a processing element 1008). For example, the user interface may be a user application, browser, user interface, and/or similar words used herein interchangeably executing on and/or accessible via the user device 1010 to interact with and/or cause display of information from the management computing entity, as described herein. The user input interface can comprise any of a number of devices or interfaces allowing the user device 1010 to receive data, such as a keypad 1018 (hard or soft), a touch display, voice/speech or motion interfaces, or other input devices. In embodiments including a keypad 1018, the keypad 1018 can include (or cause display of) the conventional numeric (0-9) and related keys (#, *), and other keys used for operating the user device 1010 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user device 1010 can also include volatile storage or memory 1022 and/or non-volatile storage or memory 1024, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program components, scripts, source code, object code, byte code, compiled code, interpreted code, machine code, executable instructions, and/or the like to implement the functions of the user device 1010. As indicated, this may include a user application that is resident on the entity or accessible through a browser or other user interface for communicating with the management computing entity and/or various other computing entities.

In another embodiment, the user device 1010 may include one or more components or functionality that are the same or similar to those of the management computing entity, as described in greater detail above. As will be recognized, these architectures and descriptions are provided for example purposes only and are not limiting to the various embodiments.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for managing a memory of a storage device, wherein the storage device comprises memory media and storage media, the method comprising:
   assigning a first memory range and a second memory range different from the first memory range to a physical memory on the memory media, wherein the first and second memory ranges are memory-mapped to correspond to a first computational component and a second computational component different from the first computational component, respectively, for performing one or more operations on the storage device,
   wherein the first and second memory ranges are allocated in the physical memory used in communication between a host and a namespace of a local storage in the storage device;
   receiving a first command to perform a first operation in the communication between the host and the namespace;
   performing the first operation using the first memory range to generate first data;
   receiving, based on the performing, from the host, a second command for managing the first memory range;
   performing, by the storage device, the second command on the first data stored on the physical memory via at least one processing element in the storage device associated with the namespace to generate second data, wherein the second data is stored at a location of the first data;
   transmitting, by the storage device, third data based on the second data to the host; and
   receiving, based on the transmitting, a third command to perform a second operation using the first memory range.

2. The method of claim 1, wherein the second command comprises an operation to set at least a portion of first data to a predetermined bit, and the third data comprises a completion indication.

3. The method of claim 1, wherein the memory comprises volatile memory or non-volatile memory located within the storage device and the method further comprises virtualizing the volatile memory or non-volatile memory.

4. The method of claim 3, wherein the method comprises communicating, to the host, via a virtual address associated with the volatile memory.

5. The method of claim 3, wherein the method further comprises dedicating a portion of the virtualized memory for the first operation or for a first duration.

6. The method of claim 1, wherein the command comprises a command generated by an application on the host and received via an application program interface (API).

7. The method of claim 1, wherein the storage device comprises a non-volatile memory express (NVMe) enabled storage device or an NVMe-over-Fabric (NVMe-oF) enabled storage device.

8. A system for managing functions, comprising:
   a host comprising an application;
   a storage device comprising a processing element, and a memory;
   wherein the system stores computer-executable instructions which, when executed by a processor, cause the processor to perform operations comprising:
      assigning a first memory range and a second memory range different from the first memory range to a physical memory, wherein the first and second memory ranges are memory-mapped to correspond to a first computational component and a second computational component different from the first computational component, respectively, for performing one or more computations on the storage device,
      wherein the first and second memory ranges are allocated in the physical memory used in communication between a host and and a namespace of a local storage in the storage device;
      receiving a first command to perform a first operation in the communication between the host and the namespace;
      performing the first operation using the first memory range to generate first data;
      receiving, based on the performing, from the application on the host, a second command for managing the first memory range;
      performing, by the storage device, the second command on the first data stored on the physical memory via at least one processing element in the storage device associated with the namespace to generate second data, wherein the second data is stored at a location of the first data;
      transmitting, by the storage device, third data based on the second data to the host; and
      receiving, based on the transmitting, a third command to perform a second operation using the first memory range.

9. The system of claim 8, wherein the second command comprises an operation to set at least a portion of first data to a predetermined bit, and the third data comprises a completion indication.

10. The system of claim 8, wherein the memory comprises volatile memory or non-volatile memory located within the storage device and the operation further comprises virtualizing the volatile memory or non-volatile memory.

11. The system of claim 10, wherein the operations further comprise communicating, to the host, via a virtual address associated with the volatile memory.

12. The system of claim 10, wherein the operations further comprise dedicating a portion of the virtualized memory for the first operation or for a first duration.

13. The system of claim 8, wherein the command comprises a command generated by an application on the host and received via an API.

14. The system of claim 8, wherein the storage device comprises an NVMe enabled storage device or an NVMe-oF enabled storage device.

15. A non-transitory computer-readable medium storing instructions that, when executed by a computer, cause the computer to perform operation for managing a memory of a storage device, the operations comprising:
   assigning a first memory range and a second memory range different from the first memory range to a physical memory, wherein the first and second memory ranges are memory-mapped to correspond to a first computational component and a second computational component different from the first computational component, respectively, for performing one or more operations on the storage device,
wherein the first and second memory ranges are allocated in the physical memory used in communication between a host and a namespace of a local storage in the storage device;
receiving a first command to perform a first operation in the communication between the host and the namespace;
performing the first operation using the first memory range to generate first data;
receiving, based on the performing, from the host, a second command for managing the first memory range;
performing, by the storage device, the second command on the first data stored on the physical memory via at least one processing element in the storage device associated with the namespace to generate second data, wherein the second data is stored at a location of the first data;
transmitting, by the storage device, third data based on the second data to the host; and
receiving, based on the transmitting, a third command to perform a second operation.

16. The non-transitory computer-readable medium of claim 15, wherein the second command comprises an operation to set at least a portion of first data to a predetermined bit, and the third data comprises a completion indication.

17. The non-transitory computer-readable medium of claim 15, wherein the memory comprises volatile memory or non-volatile memory located within the storage device and the operations further comprise virtualizing the volatile memory or non-volatile memory.

18. The non-transitory computer-readable medium of claim 17, wherein the operations further comprise communicating, to the host, via a virtual address associated with the volatile memory.

19. The non-transitory computer-readable medium of claim 17, wherein the operations further comprise dedicating a portion of the virtualized memory for the first operation or for a first duration.

20. The non-transitory computer-readable medium of claim 15, wherein the command comprises a command generated by an application on the host and received via an API.

* * * * *